United States Patent
von Krane et al.

(10) Patent No.: US 7,040,518 B2
(45) Date of Patent: May 9, 2006

(54) SUPPORT DEVICE FOR SUPPORTING AN OVERHEAD BRANCH CUTTER

(75) Inventors: Florian von Krane, Remshalden (DE); Thomas Stark, Waiblingen (DE); Joachim Hoffmann, Plochingen (DE); Jürgen Steinhauser, Stuttgart (DE)

(73) Assignee: Andreas Stihl AG & Co., Waiblingen (DE)

( * ) Notice: Subject to any disclaimer, the term of this patent is extended or adjusted under 35 U.S.C. 154(b) by 478 days.

(21) Appl. No.: 10/158,926

(22) Filed: Jun. 3, 2002

(65) Prior Publication Data

US 2002/0179665 A1 Dec. 5, 2002

(30) Foreign Application Priority Data

Jun. 1, 2001 (DE) .............. 201 09 203 U

(51) Int. Cl.
*A45C 1/04* (2006.01)
*A45F 3/00* (2006.01)

(52) U.S. Cl. .............. 224/646; 224/248; 224/641; 224/642; 224/259

(58) Field of Classification Search ............... 224/646, 224/648, 661, 662, 259, 260, 504, 159
See application file for complete search history.

(56) References Cited

U.S. PATENT DOCUMENTS

| | | | | |
|---|---|---|---|---|
| 3,575,326 A * | 4/1971 | Chappell | ..................... | 224/159 |
| 4,254,900 A * | 3/1981 | Wheeler | ..................... | 224/158 |
| 4,325,503 A * | 4/1982 | Swinney | .................. | 224/148.7 |
| 5,152,443 A * | 10/1992 | Hagan | ........................ | 224/662 |
| 5,163,591 A * | 11/1992 | Leiserson et al. | ........ | 224/148.6 |
| 5,490,618 A * | 2/1996 | Davidson | ................. | 224/148.4 |
| 5,497,921 A * | 3/1996 | Dancyger et al. | ........ | 224/148.6 |
| 5,497,923 A * | 3/1996 | Pearson et al. | ............. | 224/639 |
| 5,505,353 A * | 4/1996 | Marsh, Jr. | ................. | 224/148.6 |
| D375,184 S * | 11/1996 | Hickli et al. | ................. | D3/213 |
| 5,622,346 A * | 4/1997 | Story, Jr. | ................. | 248/311.2 |
| 5,806,730 A * | 9/1998 | Deno | ....................... | 224/148.6 |
| 5,913,464 A | 6/1999 | Häberlein | | |
| 6,029,872 A * | 2/2000 | Ellington | ..................... | 224/251 |
| 6,045,017 A * | 4/2000 | Connell | .................... | 224/148.7 |
| 6,325,261 B1 * | 12/2001 | Webber | ....................... | 224/251 |

\* cited by examiner

*Primary Examiner*—Tri M. Mai
(74) *Attorney, Agent, or Firm*—Walter Ottesen

(57) ABSTRACT

A support device (1) is for supporting a portable handheld work apparatus including an overhead branch cutter (3). The support device (1) is held to the body of the operator (17) via a belt arrangement (2). The support device (1) includes a cup (15) which has support straps (11) which are fixed to the cup (15). The free ends of the support straps (11) can be coupled to the belt arrangement (2).

18 Claims, 2 Drawing Sheets

SUPPORT DEVICE FOR SUPPORTING AN OVERHEAD BRANCH CUTTER

FIELD OF THE INVENTION

The invention relates to a support device for a work apparatus including a branch cutter.

BACKGROUND OF THE INVENTION

U.S. Pat. No. 5,913,464 discloses a belt arrangement for supporting a portable handheld work apparatus. The belt arrangement is especially for supporting or carrying a brushcutter.

The belt arrangement comprises a backplate having shoulder belts attached thereto. These shoulder belts have respective forward ends. A lateral strap starts from the backplate and runs laterally to the front. The lateral strap ends with its forward end approximately in the lower region of the chest of the operator. In addition, a lateral support plate is provided as a support device on which the work apparatus is attached. The support plate is, on the one hand, connected via a support strap to the backplate and, on the other hand, is connected via the support strap to the lateral strap. A hip belt is provided and, in the region of its rearward end, the hip belt is connected to the lower portion of the backplate and lies below the lateral strap. The hip belt comes to rest against the hips of the operator. The hip belt is open in the direction toward the support plate and its forward end lies below approximately the end of the lateral strap and the hip belt can be connected to the support strap of the carrier plate. The free forward ends of the shoulder belt lie separated from each other and spaced from the forward end of the hip belt as well as from the forward end of the lateral strap. Lateral connecting straps are provided which connect the free forward ends of the shoulder belts to the lower region of the backplate.

SUMMARY OF THE INVENTION

It is an object of the invention to provide a support device which permits an operator to work with a portable handheld work apparatus, such as an overhead branch cutter, in a manner which saves strength and is not tiring.

The support device of the invention is for carrying a portable handheld work apparatus including an overhead branch cutter. The work apparatus is held on the body of an operator with a belt arrangement and the support device includes: a cup for receiving the work apparatus therein; a support strap fixed on the cup and having respective free ends; and, means for coupling the free ends to the belt arrangement.

The housing of an overhead branch cutter can be positioned in the cup of the support device so that the weight of the overhead branch cutter is transmitted to the belt arrangement via the cup and the support device. The belt arrangement transmits the weight uniformly to the shoulders of the operator. It is practical to so configure the support device that it can be coupled to an existing belt arrangement as used, for example, for carrying a brushcutter. As part of the invention, it is provided that the cup is substantially stable with respect to form and is advantageously made of plastic. In this way, the apparatus housing, which is mounted in the cup, is stabilized and the work with the apparatus is simplified. In order to easily adapt the support strap to different operators, the invention provides that the support device can be adjustably coupled to the belt arrangement. The cup advantageously includes openings which reduce the weight of the support device and function for cooling the work apparatus with ambient air.

The cup is advantageously formed from an approximately U-shaped elongated member and longitudinal straps which connect the free leg ends of the elongated member to each other and define the edge of the openings of the cup. With the openings so formed in the cup, the unimpeded inflow of cooling and combustion air is facilitated as is the unimpeded outflow of the cooling air and the exhaust gases.

In an advantageous embodiment of the invention, the support device includes a transverse strap, which is fixed to the support strap at two locations and, with the support strap, defines a ring which forms the opening edge of the cup. The transverse strap is especially arranged on a side of the elongated member which faces toward the operator. The transverse strap can be displaced in its longitudinal direction relative to the elongated member. The transverse strap runs especially in a loop arranged on the elongated member. In order to be able to simply and rapidly fix the support strap to the support device, it can be provided that one end of the support strap is attached to the belt arrangement via an insert coupling, especially via an insert latch. One element of the insert latch is arranged on the support strap and the counterpiece of the insert coupling is arranged on the belt assembly.

According to another feature of the invention, a leg strap is provided with which the cup can be fixed to the thigh of the operator. In order to easily and rapidly adapt the leg strap to different operators, and to be able to easily mount and remove the support straps, the belt strap is provided with an adjustable latch.

The cup is at least partially padded on its inner side. In this way, a firm seat of the apparatus housing in the cup is achieved and tolerances are compensated. In order to permit the operator to comfortably support the work apparatus on the thigh, the cup is at least padded on the side facing toward the body of the operator. With this padding, vibrations are also damped which are transmitted to the housing by the drive motor of the work apparatus.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
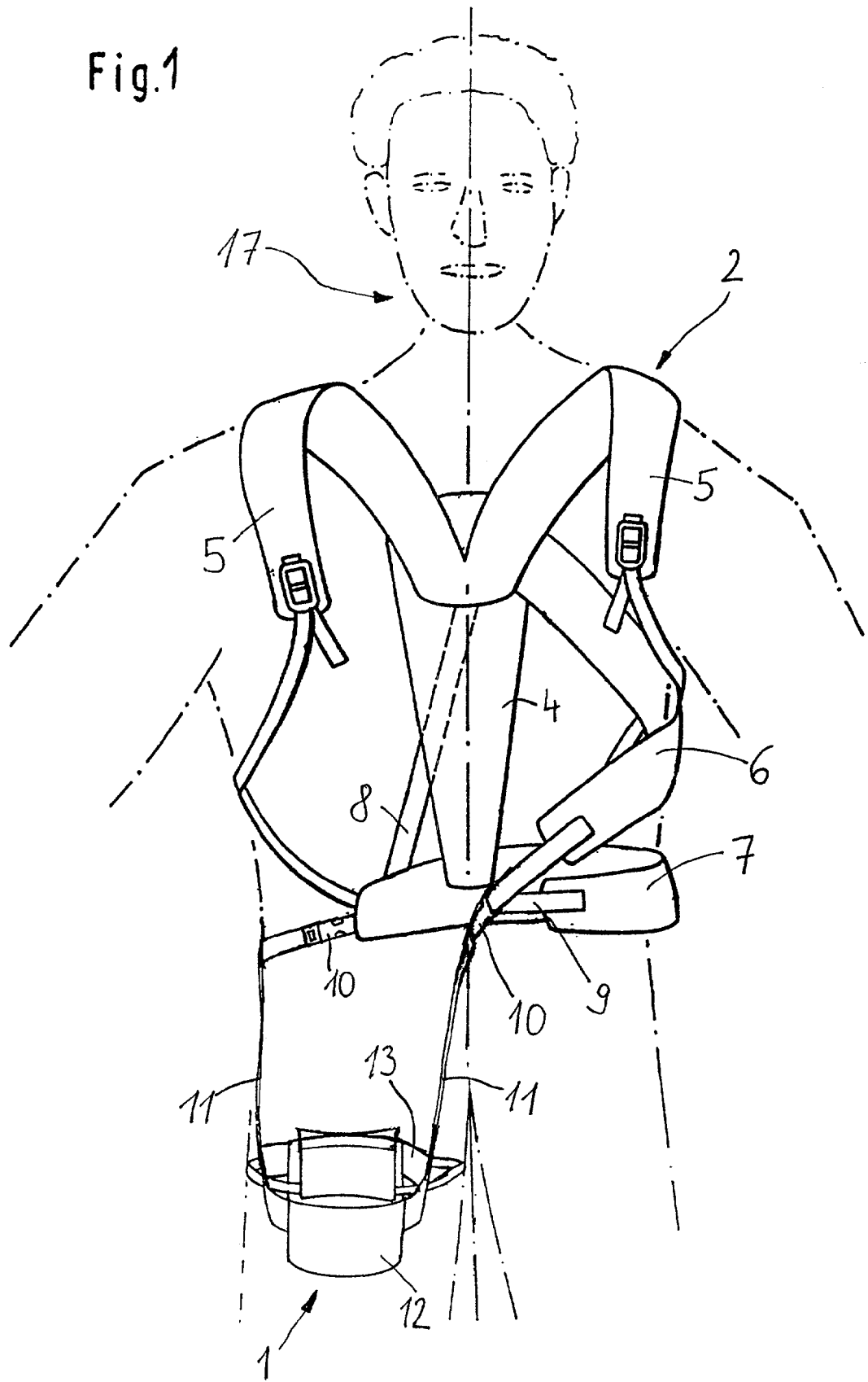
FIG. 1 is a schematic of a belt arrangement having a support device for an overhead branch cutter.
Figure 3:
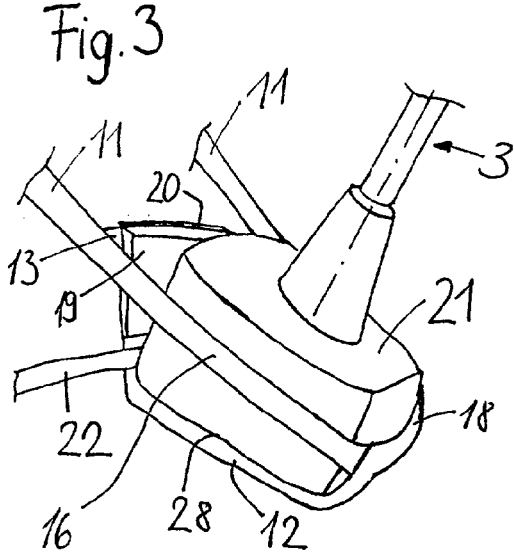
FIG. 3 is a schematic side view of the support device of FIG. 1 with an overhead branch cutter mounted therein.

FIG. 1 shows a support device 1 for carrying a branch cutter 3 (see FIG. 3). The support device 1 is fixed to a belt arrangement 2. The belt arrangement 2 corresponds to a usual arrangement for carrying portable handheld work apparatus and is disclosed, for example, in U.S. Pat. No. 5,913,464 incorporated herein by reference. The belt arrangement 2 includes the following: a backplate 4 with two shoulder belts 5 attached thereto; a lateral strap 6, a hip belt 7 and a load-bearing strap 8.

A connecting strap 9 connects the lateral strap 6 and the hip belt 7 on the forward side of the operator 17. A first fastening member 10 is arranged on the connecting strap 9 and a second fastening member is connected to the rearward end of the hip belt 7. The support device 1 includes a support strap 11. A matching part 25 to the fastening member 10 is mounted on each end of the support strap 11 with the fastening members 10 being mounted on the belt arrangement 2.

Figure 5:
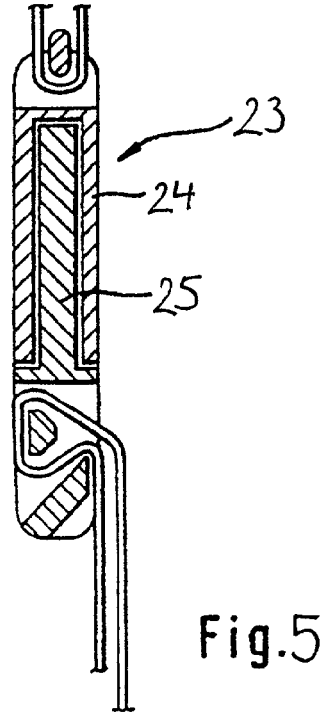
FIG. 5 is a section view taken along line V—V of FIG. 4.
Figure 4:
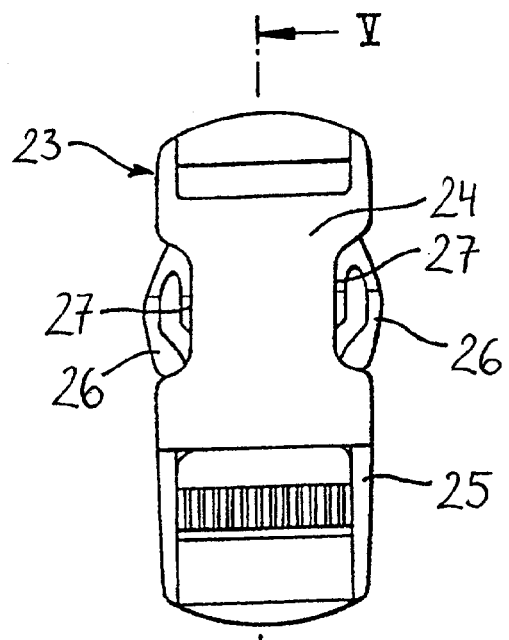
FIG. 4 is a schematic plan view of an insert latch.

An embodiment for a fastening member 24 shown in FIGS. 4 and 5 is explained hereinafter.

Figure 2:
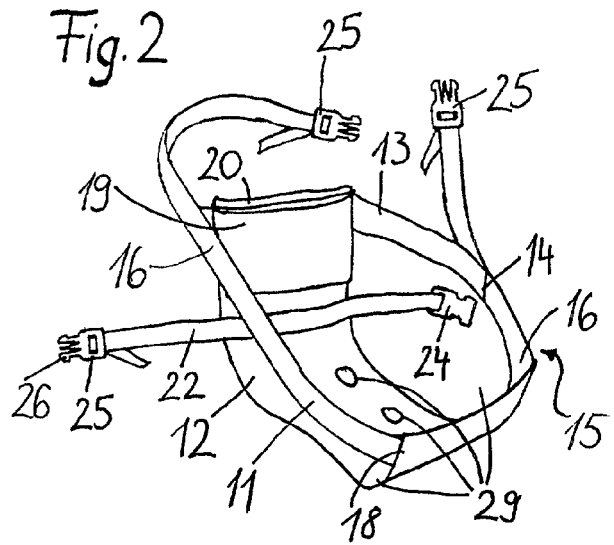
FIG. 2 is a schematic of the support device shown in FIG. 1.

As shown in FIG. 2, the support device 1 comprises a U-shaped elongated member 12, the support strap 11 and a transverse strap 13. The elongated member 12 is enclosed by straps at the upper region thereof. At the end of the elongated member 12, which faces away from the operator 17, the support strap 11 surrounds the elongated member 12 and, on the side of the elongated member 12, which faces toward the operator 17, a transverse strap 13 surrounds the elongated member 12. In the same way, it is possible that the support strap 11 is arranged on the end of the elongated member 12 which faces toward the operator and the transverse strap 13 is arranged on the opposite-lying end. The transverse strap 13 is fixed at both longitudinal ends of the elongated member 12 to the support strap 11 so that the transverse strap 13 and the section of the support strap 11, which lies between the attachment locations 14 of the transverse strap 13, define a ring which also contains the longitudinal straps 16. The longitudinal straps 16 connect the legs of the elongated member 12 at their longitudinal ends.

The longitudinal straps 16 can be formed by different arrangements. In order to fulfill its function, it is, for example, also possible to configure the transverse strap 13 as a closed ring, to which respective ends of a two-part support strap 11 are fixed at two locations, or which, in order to achieve a greater stiffness, is enclosed by the support strap 11 on the end of the elongated member 12 which faces away from the operator 17. In lieu of forming the longitudinal strap 16 as a ring, the longitudinal strap 16 can be formed by belts which do not enclose the elongated member; instead, the belts are fixed at both ends to one of the longitudinal ends of the elongated member 12 at respective legs. The longitudinal belts 16 and the elongated member 12 conjointly define a cup 15 in which the housing 21 of an apparatus can be positioned. The cup 15 includes openings 29 which are formed by the intermediate spaces between the longitudinal straps 16 and the elongated member 12 as well as by cutouts in the elongated member 12. At both legs, the elongated member 12 has loops 18 in which the transverse strap 13 and the support strap 11 are arranged so as to be movable in their longitudinal direction.

Padding 20 is applied on the side of the cup 15 facing toward the operator 17. The padding 20 increases the carrying comfort for the operator 17 and avoids pressure locations. Padding 19 is provided on the inner side of the cup 15 and fixes the housing 21 of the apparatus mounted in the cup 15. The padding 19 on the inner side of the cup 15 can be configured differently depending upon the housing shape of the work apparatus to be accommodated. A leg strap 22 is arranged on the elongated member 12. With the leg strap 22, the cup 15 can be fixed to the thigh of the operator 17. The leg strap 22 is closed by the attachment member 24 and the counterpiece 25 which advantageously define a latchable insert latch 23 which is easy to open. The support device 1 is also attached to the belt arrangement with such an insert latch 23 shown in FIGS. 4 and 5. The attachment member 24 is configured as an insert coupling and is fixed to a first belt end. The counterpiece 25 has lateral latching arms or detents 26 which snap into lateral latch openings 27 of the attachment member 24 whereby the insert latch 23 is closed. To open the insert latch 23, the detents 26 are pressed down whereby they come clear of the latch openings 27. The counterpiece 25 can be adjusted in length on an end of a belt which is to be connected to the first belt end.

In FIG. 3, a housing 21 of an overhead branch cutter is shown which is mounted in the support device 1. The support strap 11 of the support device 1 encloses the housing 21 at its periphery at an elevation whereat a sufficient attachment of the housing 21 is ensured and the inflowing and outflowing air is at most insignificantly hindered. The base 28 of the housing 21 is seated on the elongated member 12. The lateral fixing takes place via longitudinal straps 16 which are here defined by the support strap 11 and the transverse strap 13 and the padding 19 applied to the inner side of the elongated member 12.

It is understood that the foregoing description is that of the preferred embodiments of the invention and that various changes and modifications may be made thereto without departing from the spirit and scope of the invention as defined in the appended claims.

What is claimed is:

1. A support device for carrying a motorized portable handheld work apparatus including an overhead branch cutter, the work apparatus being held on the body of an operator with a belt arrangement, the support device comprising:
   a cup for receiving a housing for said work apparatus therein during operation of said work apparatus;
   said cup being substantially stable as to form and including an approximately U-shaped elongated member having first and second free leg ends;
   said cup further including first and second longitudinal straps and first and second transverse straps;
   said free leg ends, said longitudinal straps and said transverse straps conjointly defining a closed annularly-shaped opening rim of said cup;
   first and second support straps for connecting said opening rim at the region of said longitudinal and transverse straps to said belt arrangement on the body of the operator; and,
   a leg belt mounted on said U-shaped elongated member for fixing said cup to the thigh of the operator.

2. The support device of claim 1, wherein said longitudinal and transverse straps define first and second connecting points on said opening rim laterally of said free leg ends and said first and second support straps being connected to said opening rim at corresponding ones of said connecting points for connecting said cup to said belt arrangement.

3. The support device of claim 1, wherein said cup is made of plastic.

4. The support device of claim 1, wherein said cup has openings provided therein.

5. The support device of claim 1, wherein said first and second support strips have respective free ends; and, wherein said support device further comprises first and second coupling means for coupling respective ones of said free ends to said belt arrangement and each of said coupling means including means for adjustably coupling said support device on said belt arrangement.

6. The support device of claim 1, wherein said transverse strap is disposed on the side of a U-shaped elongated member facing toward said operator.

7. The support device of claim 1, wherein said transverse strap is displaceable in the longitudinal direction thereof relative to a U-shaped elongated member.

8. The support device of claim 7, wherein said U-shaped elongated member has a loop and said transverse strap extends through said loop.

9. The support device of claim 1, said coupling means including first and second insert latch devices for coupling corresponding ones of said free ends to said belt arrangement; and, each of said insert latch devices having a first latch element on one of said free ends and a second latch element on said belt arrangement.

10. The support device of claim 1, further comprising a leg strap for fixing said cup to the thigh of said operator.

11. The support device of claim 10, said leg strap including an adjustable latch.

12. The support device of claim 1, wherein said cup has an inner side and padding on at least a portion of said inner side.

13. The support device of claim 1, wherein said cup has an outer side facing toward said operator and padding on at least a portion of said outer side.

14. The support device of claim 1, wherein the weight of said work apparatus is transferred via said cup to said belt arrangement when said work apparatus is in an overhead position.

15. The support device of claim 1, wherein said work apparatus is an overhead branch cutter.

16. The support device of claim 1, wherein the weight of said work apparatus, when in an overhead position, is transmitted to said belt arrangement.

17. The support device of claim 16, wherein said weight is transmitted via said cup and said support device to said belt arrangement and said belt arrangement transmits said weight uniformly to the shoulders of said operator.

18. The support device of claim 16, wherein said work apparatus is an overhead branch cutter.

* * * * *